United States Patent
Lin et al.

(10) Patent No.: US 11,163,877 B2
(45) Date of Patent: Nov. 2, 2021

(54) METHOD, SERVER, AND COMPUTER STORAGE MEDIUM FOR IDENTIFYING VIRUS-CONTAINING FILES

(71) Applicant: TENCENT TECHNOLOGY (SHENZHEN) COMPANY LIMITED, Shenzhen (CN)

(72) Inventors: Shujie Lin, Shenzhen (CN); Yi Yang, Shenzhen (CN); Luxin Li, Shenzhen (CN); Tao Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 265 days.

(21) Appl. No.: 15/700,650

(22) Filed: Sep. 11, 2017

(65) Prior Publication Data
US 2017/0372069 A1    Dec. 28, 2017

Related U.S. Application Data

(63) Continuation of application No. PCT/CN2016/080796, filed on Apr. 29, 2016.

(30) Foreign Application Priority Data

Sep. 2, 2015    (CN) .......................... 201510555804.2

(51) Int. Cl.
*G06F 21/56*    (2013.01)

(52) U.S. Cl.
CPC ............ *G06F 21/564* (2013.01); *G06F 21/56* (2013.01); *G06F 21/563* (2013.01); *G06F 21/567* (2013.01); *G06F 2221/033* (2013.01)

(58) Field of Classification Search
None
See application file for complete search history.

(56) References Cited

U.S. PATENT DOCUMENTS

| 5,930,392 A * | 7/1999 | Ho ....................... G06K 9/6282 382/224 |
| 7,310,624 B1 * | 12/2007 | Aggarwal .............. G06F 16/30 706/45 |

(Continued)

FOREIGN PATENT DOCUMENTS

| CN | 103164651 A | 6/2013 |
| CN | 103942495 A | 7/2014 |

(Continued)

OTHER PUBLICATIONS

Menze, B.H., Keim, B.M., Masuch, R. et al. A comparison of random forestand its Gini importance with standard chemometric methods for the feature selection and classification of spectral data. BMC Bioinformatics 10, 213 (2009). https://doi.org/10.1186/1471-2105-10-213.*

(Continued)

*Primary Examiner* — Jeffrey Nickerson
*Assistant Examiner* — Vadim Savenkov
(74) *Attorney, Agent, or Firm* — Anova Law Group, PLLC (57) ABSTRACT

The present disclosure discloses an information processing method, including the steps of acquiring at least one executable file of a specified type; extracting a first operation instruction from the at least one executable file of the specified type; determining the first operation instruction as a feature instruction if a preset policy is met; extracting a feature value of the feature instruction; constructing a virus classification model based on the feature value of the feature instruction for obtaining a virus structural feature parameter; extracting a second operation instruction from at least one to-be-analyzed file when the at least one to-be-analyzed file is identified according to the virus classification model; and identifying the to-be-analyzed file as a virus file if the feature (Continued)

value of the second operation instruction corresponds to the virus structural feature parameter.

17 Claims, 7 Drawing Sheets

(56) References Cited

U.S. PATENT DOCUMENTS

| | | | | |
|---|---|---|---|---|
| 7,424,619 | B1* | 9/2008 | Fan | G06F 21/552 |
| | | | | 713/188 |
| 7,505,948 | B2* | 3/2009 | Saidi | G06F 17/18 |
| | | | | 706/14 |
| 7,930,353 | B2* | 4/2011 | Chickering | H04L 51/12 |
| | | | | 709/206 |
| 8,190,647 | B1* | 5/2012 | Pereira | G06F 21/566 |
| | | | | 707/749 |
| 8,375,450 | B1* | 2/2013 | Oliver | G06F 21/564 |
| | | | | 726/24 |
| 8,401,982 | B1* | 3/2013 | Satish | G06N 20/00 |
| | | | | 706/20 |
| 8,682,812 | B1* | 3/2014 | Ranjan | H04L 63/1425 |
| | | | | 706/12 |
| 8,694,444 | B2* | 4/2014 | Faddoul | H04L 51/12 |
| | | | | 706/12 |
| 8,839,418 | B2* | 9/2014 | Hulten | H04L 63/1441 |
| | | | | 726/22 |
| 9,491,187 | B2* | 11/2016 | Sridhara | H04L 63/1408 |
| 9,609,456 | B2* | 3/2017 | Valencia | G06F 8/71 |
| 9,690,938 | B1* | 6/2017 | Saxe | G06F 21/563 |
| 9,769,189 | B2* | 9/2017 | Mohaisen | H04L 63/1425 |
| 2002/0133721 | A1* | 9/2002 | Adjaoute | G06Q 20/4016 |
| | | | | 726/23 |
| 2006/0287969 | A1* | 12/2006 | Li | G16B 40/00 |
| | | | | 706/16 |
| 2009/0210369 | A1* | 8/2009 | Shao | G06F 16/951 |
| | | | | 706/21 |
| 2009/0300765 | A1* | 12/2009 | Moskovitch | G06F 21/562 |
| | | | | 726/24 |
| 2010/0192222 | A1* | 7/2010 | Stokes | G06F 21/563 |
| | | | | 726/22 |
| 2012/0066125 | A1* | 3/2012 | Ma | G06Q 20/40 |
| | | | | 705/44 |
| 2012/0084859 | A1* | 4/2012 | Radinsky | G06F 21/56 |
| | | | | 726/23 |
| 2012/0096551 | A1* | 4/2012 | Lee | G06F 21/55 |
| | | | | 726/23 |
| 2012/0233127 | A1* | 9/2012 | Solmer | G06F 16/93 |
| | | | | 707/661 |
| 2012/0317644 | A1* | 12/2012 | Kumar | G06F 21/552 |
| | | | | 726/24 |
| 2014/0075497 | A1* | 3/2014 | Luo | G06F 21/552 |
| | | | | 726/1 |
| 2014/0090061 | A1* | 3/2014 | Avasarala | G06F 21/56 |
| | | | | 726/24 |
| 2014/0179270 | A1* | 6/2014 | Anand | H04W 12/12 |
| | | | | 455/410 |
| 2015/0264063 | A1* | 9/2015 | Jenson | H04L 63/1408 |
| | | | | 726/22 |
| 2016/0078361 | A1* | 3/2016 | Brueckner | H04L 67/10 |
| | | | | 706/12 |
| 2016/0127319 | A1* | 5/2016 | Xiong | H04L 63/0263 |
| | | | | 726/1 |
| 2016/0154960 | A1* | 6/2016 | Sharma | G06F 21/56 |
| | | | | 726/25 |
| 2016/0253598 | A1* | 9/2016 | Yamada | G06N 20/00 |
| | | | | 706/12 |
| 2016/0335432 | A1* | 11/2016 | Vatamanu | G06F 21/552 |
| 2016/0335435 | A1* | 11/2016 | Schmidtler | G06F 21/565 |
| 2017/0046510 | A1* | 2/2017 | Chen | G06F 21/552 |
| 2017/0069216 | A1* | 3/2017 | Vaughan | A61B 5/7275 |

FOREIGN PATENT DOCUMENTS

| | | |
|---|---|---|
| CN | 104700030 A | 6/2015 |
| CN | 104751054 A | 7/2015 |

OTHER PUBLICATIONS

The World Intellectual Property Organization (WIPO) International Search Report for PCT/CN2016/080796 dated Jul. 21, 2016 pp. 1-6.

* cited by examiner

METHOD, SERVER, AND COMPUTER STORAGE MEDIUM FOR IDENTIFYING VIRUS-CONTAINING FILES

RELATED APPLICATION

This application is a continuation application of PCT Patent Application No. PCT/CN2016/080796, filed on Apr. 29, 2016, which claims priority to Chinese Patent Application No. 2015105558042, entitled "INFORMATION PROCESSING METHOD AND SERVER, AND COMPUTER STORAGE MEDIUM", filed on Sep. 2, 2015, the entire contents of both of which are incorporated herein by reference.

FIELD OF THE TECHNOLOGY

The present disclosure relates to software virus detection technology, and in particular, to an information processing method and a server, and a computer storage medium.

BACKGROUND OF THE DISCLOSURE

With the development of network technologies, software viruses spread more quickly and become more destructive, posing a huge challenge to anti-virus tasks. The mainstream solution for identifying viruses may be as follows: 1. Extract a segment of binary feature code from a known virus sample, wherein the binary feature code can be used to uniquely identify a virus; add the feature code to a virus database, and search whether there is a matched virus feature when the identifying the virus; 2. Test an unknown virus on a virtual machine to detect a virus behavior, thereby identifying the virus.

Disadvantages the foregoing method may include the following. By using the first solution, a technology of extracting a virus feature code, though a known virus can be quickly and precisely identified, a new virus cannot be identified or a false positive rate of identification is high. By using the second solution, the detected result of running a virus on a virtual machine to detect a virus behavior completely relies on an analyst's professional capability. This greatly increases labor cost, and has problems such as a relatively high false positive rate. In addition, the virus further may be a shell virus, leading to a problem of low efficiency due to a large amount of viruses when the analyst uses an application programming interface (API). However, there is no effective solution for precisely identifying a virus.

SUMMARY

In view of this, embodiments of the present disclosure are desirable to provide an information processing method and a server, and a computer storage medium. This at least resolves problems in the existing technology, and can precisely identify a virus.

The technical solutions of the present disclosure are implemented as follows.

On aspect of the present disclosure provides an information processing method. The method includes acquiring at least one executable file of a specified type; extracting a first operation instruction from the at least one executable file of the specified type; determining the first operation instruction as a feature instruction if a preset policy is met; extracting a feature value of the feature instruction; constructing a virus classification model based on the feature value of the feature instruction for obtaining a virus structural feature parameter; extracting a second operation instruction from at least one to-be-analyzed file when the at least one to-be-analyzed file is identified according to the virus classification model; and identifying the to-be-analyzed file as a virus file if the feature value of the second operation instruction corresponds to the virus structural feature parameter.

Another aspect of the present disclosure provides a server for identifying virus files, comprising: a memory, a processor coupled to the memory, the processor being configured to acquire at least one executable file of a specified type, extract a first operation instruction from the at least one executable file of the specified type, determine the first operation instruction as a feature instruction if a preset policy is met; extract a feature value of the feature instruction, construct a virus classification model by using the feature value of the feature instruction for obtaining a virus structural feature parameter; and extract a second operation instruction from at least one to-be-analyzed file when the at least one to-be-analyzed file is identified according to the virus classification model, determine whether a feature value of the second operation instruction corresponds to the virus structural feature parameter, and identify the to-be-analyzed file as a virus file if the virus structural feature parameter is met.

Another aspect of the present disclosure provides a computer storage medium, storing a computer executable instruction in the computer storage medium, and the computer executable instruction configured to perform the information processing method, comprising: acquiring at least one executable file of a specified type; extracting a first operation instruction from the at least one executable file of the specified type; determining the first operation instruction as a feature instruction if a preset policy is met; extracting a feature value of the feature instruction; constructing a virus classification model based on the feature value of the feature instruction for obtaining a virus structural feature parameter; and extracting a second operation instruction from at least one to-be-analyzed file when the at least one to-be-analyzed file is identified according to the virus classification model; and identifying the to-be-analyzed file as a virus file based on whether a feature value of the second operation instruction corresponds to the virus structural feature parameter.

DESCRIPTION OF EMBODIMENTS

The following further describes implementation of the technical solutions in detail with reference to the accompanying drawings.

Figure 1:
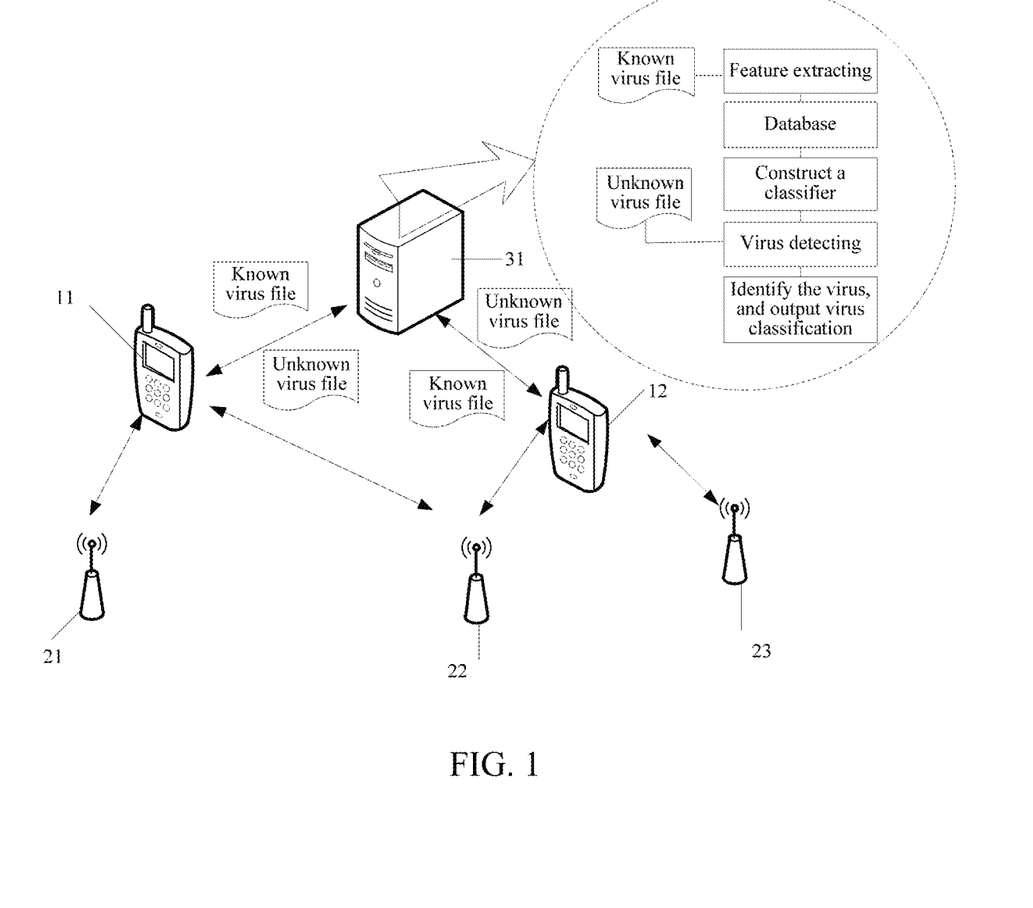
FIG. 1 is a schematic diagram of hardware components performing information exchange according to an embodiment of the present disclosure.

FIG. 1 is an exemplary schematic diagram of hardware components performing information exchange among each other according to an embodiment of the present disclosure. FIG. 1 includes a terminal device 11-12, a base station 21-23, and a server 31. In the process of information exchange between terminals, a terminal and a server, a normal file without a virus or a virus file may both be transmitted. The virus file may be a known virus file or an unknown virus file. To ensure information security during information exchanges, it is necessary to identify a virus from a large amount of data.

As shown in the system of FIG. 1, according to the embodiment of the present disclosure, the virus file may be received on the server 31 side, including a known virus file or an unknown virus file. Because the virus file may often be an executable file, the executable file that may be the virus file is first identified and analyzed. When a feature of the first operation instruction in the executable file meets a preset policy, the executable file is considered a known virus file. A first operation instruction that meets the preset policy in the known virus file is considered a feature instruction and a feature value thereof is extracted, so as to construct a virus classification model according to the extracted feature value, thereby obtaining a virus structural feature parameter through analysis. Subsequently, identification is performed on a to-be-analyzed file to determine whether to extract a second operation instruction from the to-be-analyzed file when the to-be-analyzed file is a virus file, and to determine whether a feature value of the second operation instruction meets the virus structural feature parameter. If the virus structural feature parameter is met, the to-be-analyzed file is identified as a virus file.

For the system architecture shown in FIG. 1, for example, at least the following process in the server 31 may be completed: 1) extracting and processing a feature of the known virus; 2) saving the extracted feature to a database for subsequently constructing a classifier; 3) constructing the classifier used for identifying a virus and specific virus classification according to the extracted feature; 4) detecting an unknown virus file by using the constructed classifier, identifying the virus, and outputting virus classification.

The foregoing example of FIG. 1 is merely a system architecture example for implementing embodiments of the present disclosure. The embodiments of the present disclosure are not limited to the system architecture of FIG. 1. Various embodiments of the present disclosure are provided based on the system structure.

Figure 2:
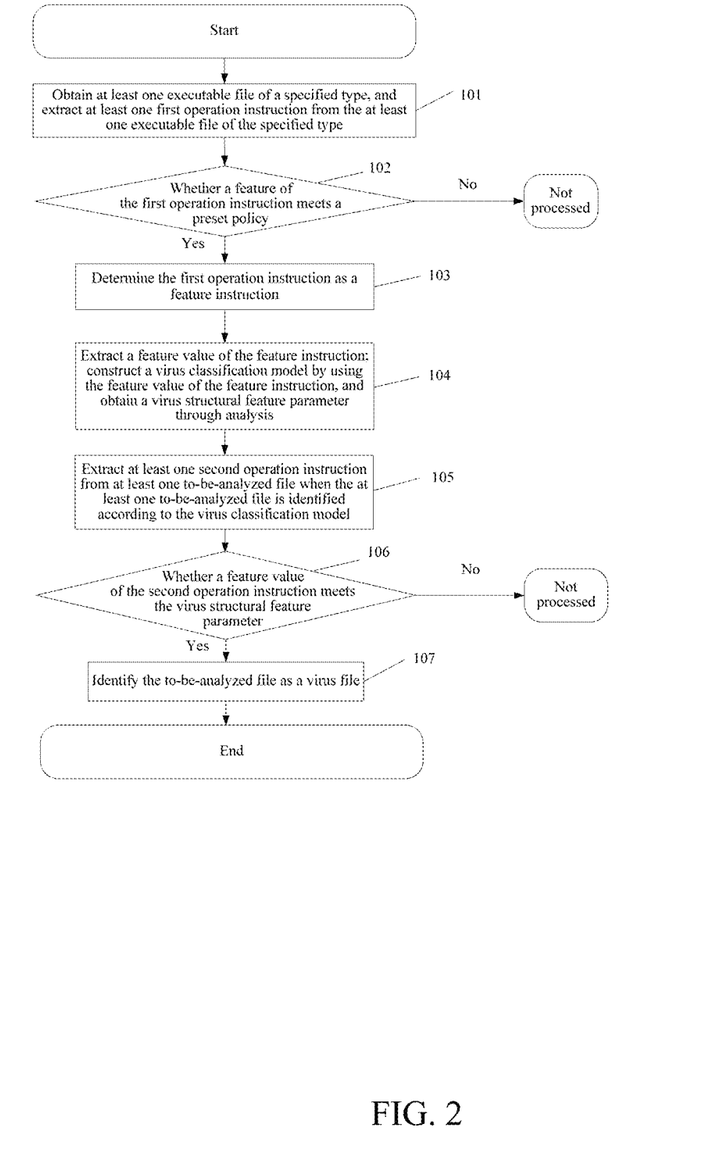
FIG. 2 is a schematic diagram of an implementation process according to various embodiments of the present disclosure.

An information processing method of an embodiment of the present disclosure, as shown in FIG. 2, the method includes the following steps.

Step 101. Acquire at least one executable file of a specified type, and extract at least one first operation instruction from the at least one executable file of the specified type.

In some embodiments, because a virus file is usually an executable file, the executable file that may be the virus file is first identified and analyzed. The executable file that may be the virus file may be referred to as a PE file. A file name extension of the PE file is usually ".exe". The PE file may include a large number of static information. The static information may include general information and instruction information. For example, the general information may be function entry information, and the instruction information is an operation instruction calling the function.

Step 102. Determine whether a feature of the first operation instruction meets a preset policy. If the feature of the first operation instruction meets a preset policy, step 103 is performed. Otherwise, no processing step is executed.

In some embodiments, because the server does not determine whether the PE file is a file requiring analyzing, that is, a known virus file, instruction information in the PE file needs to be identified and analyzed.

Instruction information of the known virus file has particular features. For example, some instruction information in the virus file may call some special system application programming interface (API) functions to achieve the objective of disruption, such as a reading and writing operation on a register or modifying a system key path. Viruses of a same type often have similar code. For example, occurrence frequency and frequency of the instruction information having these features can be quite frequent, or occurrence frequency and frequency of the instruction information that does not have a particular feature are also quite frequent. For example, many viruses may extract an area size or an edge at an entry of code as a feature value by using an encryption technology. The area size may refer to the spread of computer code or instructions or how many entries or exit points a program has to another software program module. The edge may refer to where the computer code of one program module connects with the computer code of another program module. Therefore, by using these situations (e.g., coverage area and edge condition of the API entry) as a preset policy, the instruction information in the PE file may be identified and analyzed, and compared with a feature in the preset policy according to the feature of the instruction information. If it is found that the instruction information has a particular feature, such instruction information is considered an important feature instruction, and used for subsequently constructing a classifier.

Step 103. Determine the first operation instruction as a feature instruction if the feature of the first operation instruction meets the preset policy.

In some embodiments, the preset policy includes: as referred in step 102, some instruction information in the virus file may call some special system application programming interface (API) functions to achieve the objective of disruption, such as a reading and writing operation on a register or modifying a system key path. Viruses of a same type often have similar code. For example, the instruction information having these features occurs for many times frequently, or the instruction information that does not have a particular feature also occurs for many times frequently under a condition of uncertainty. For example, many viruses may extract an area size or an edge at an entry of code as a feature value by using an encryption technology. Policies are not limited in this context.

Step 104. Extract a feature value of the feature instruction; construct a virus classification model by using the feature value of the feature instruction; and obtain a virus structural feature parameter through analysis.

In some embodiments, by analyzing a feature value of an important feature instruction in a known virus file through steps 101-103, and constructing a virus classification model by using the feature value of the feature instruction, a virus structural feature parameter obtained through analysis can certainly summarize a general performance of most viruses and variations thereof or new viruses having a similar structure, thereby providing a better determining basis for final virus detecting.

Step 105. Extract at least one second operation instruction from at least one to-be-analyzed file when the at least one to-be-analyzed file is identified according to the virus classification model.

Figure 3:
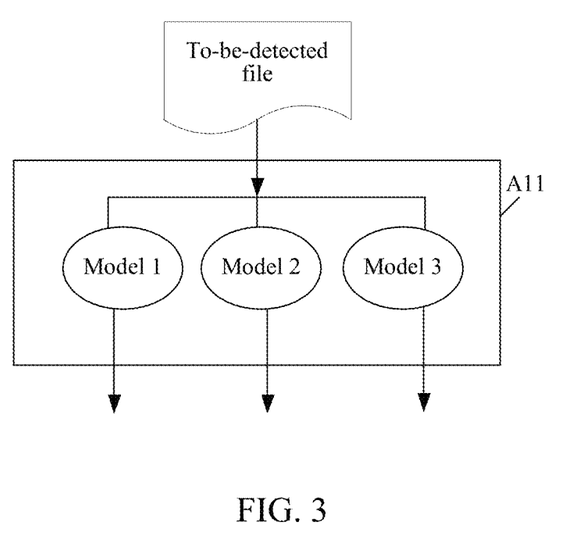
FIG. 3-5 is a schematic diagram of an exemplary classification model (a classifier) according to an embodiment of the present disclosure.
Figure 4:
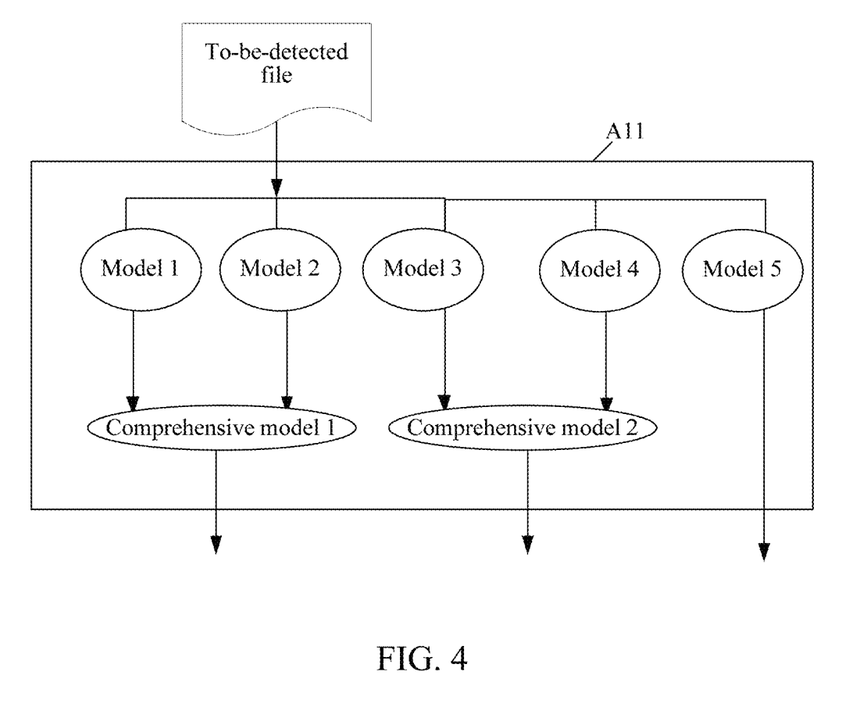
Figure 5:
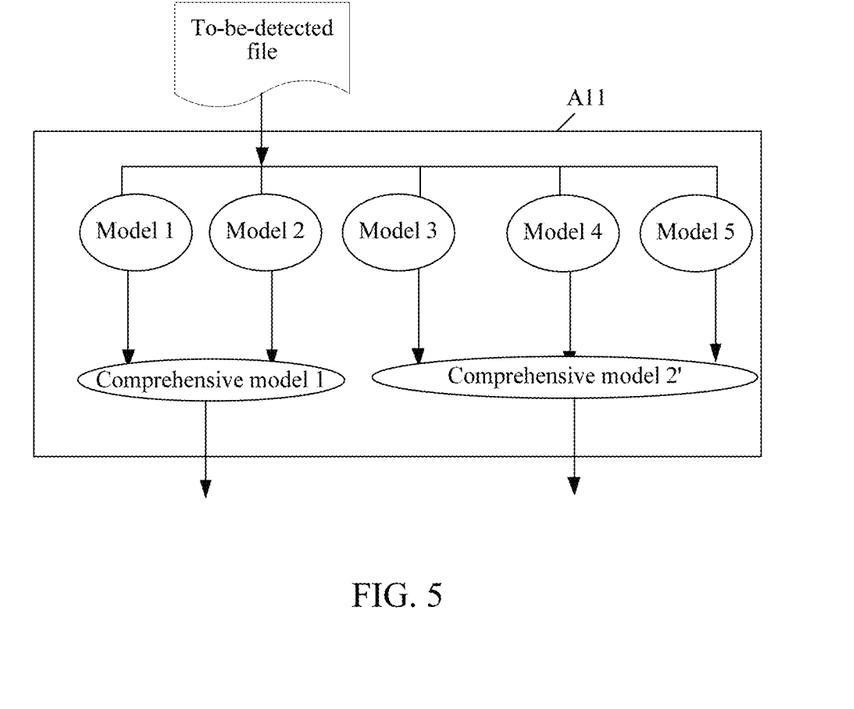

The to-be-analyzed file may be a new virus file, or may be a normal file without a virus. Identification performed on the at least one to-be-analyzed file according to the virus classification model actually is a matching of virus structural feature parameters. The virus classification model includes structural feature parameters of various viruses. The virus classification model is at least one. When the virus classification model is more than one, for example, two virus classification models, a virus structural feature parameter in any one of the virus classification models may be used to match the to-be-analyzed file. Alternatively, the two virus classification models may be iterated or superimposed to first obtain a comprehensive classification model, and then the virus structural feature parameter in the comprehensive classification model is used to match the to-be-analyzed file. In some embodiments, the virus classification models may be more, such as five, and a comprehensive classification model may be obtained by using one virus classification model to iterate or superimpose at least another one virus classification model thereof, for example, respectively iterating or superimposing in pairs to obtain a first comprehensive classification model and a second comprehensive classification model, and then iterating or superimposing a remaining original classification model. FIG. 3-FIG. 5 show several examples of iterated or superimposed combinations of classification models (or referred to as a classifier).

Step 106. Determine whether a feature value of the second operation instruction meets the virus structural feature parameter. If the feature value of the second operation instruction meets the virus structural feature parameter, step 107 is performed. Otherwise, no further process step is executed.

Step 107. Identify the to-be-analyzed file as a virus file if the feature value of the second operation instruction meets the virus structural feature parameter.

The to-be-analyzed file may be a new virus file, or may be a normal file without a virus. A feature value of the instruction information is extracted from the to-be-analyzed file. Identification performed on the at least one to-be-analyzed file according to the virus classification model actually is a matching of virus structural feature parameters. As long as there is at least one matching result, it indicates that the to-be-analyzed file is a virus file. Further, a virus type of the virus file, or a virus type of one or more instruction information in the virus file is distinguished according to a virus classification result of the virus classification model.

As shown in FIG. 3-FIG. 5, there may be several examples of iterated or superimposed combinations of classification models (or referred to as a classifier). In FIG. 3-FIG. 5, a classification constructor is represented by A11. As shown in FIG. 3, there may be three virus classification models constructed in the classification constructor; a to-be-analyzed file separately matches structural feature parameters in any one of the virus classification models. As shown in FIG. 4, there may be five virus classification models constructed in the classification constructor; the four virus classification models in models 1-4 may be iterated or superimposed in pairs to obtain a comprehensive classification model 1 and a comprehensive classification model 2; the model 5 is not iterated or superimposed; subsequently, structural feature parameters of viruses in the comprehensive classification model 1, the comprehensive classification model 2, and the model 5 may be used to match the to-be-analyzed file. As shown in FIG. 5, there may be five virus classification models constructed in the classification constructor; the two virus classification models in models 1-2 may be iterated or superimposed in pairs to obtain a comprehensive classification model 1; the three virus classification models in models 3-5 may be iterated or superimposed in pairs to first obtain a comprehensive classification model 2'; subsequently, structural feature parameters of viruses in the comprehensive classification model 1 and the comprehensive classification model 2' may be used to match the to-be-analyzed file.

In some embodiments, in one application, in step 102, the determining whether a feature of the first operation instruction meets a preset policy may be performed based on a principle of one or more of the following manners. In the first example, the step may include: determining whether the first operation instruction is used to call a specified system application programming interface API function to perform operations including modifying a registry or modifying a system critical path, and if the first operation instruction is used to call the specified system application programming interface API function to perform operations including modifying a registry or modifying a system critical path, determining that the preset policy is met. In the second example, the step may include: determining whether occurrence frequency and/or the number of times of the first operation instruction reach/reaches a preset threshold, if the occurrence frequency and/or the number of times of the first operation instruction reach/reaches the preset threshold, determining that the preset policy is met. In the third example, the step may include: determining whether an area size and/or an edge at an entry of static code information included by the first operation instruction meet/meets a preset condition, if the area size and/or the edge at the entry of the static code information included by the first operation instruction meet/meets the preset condition, determining that the preset policy is met.

Figure 6:
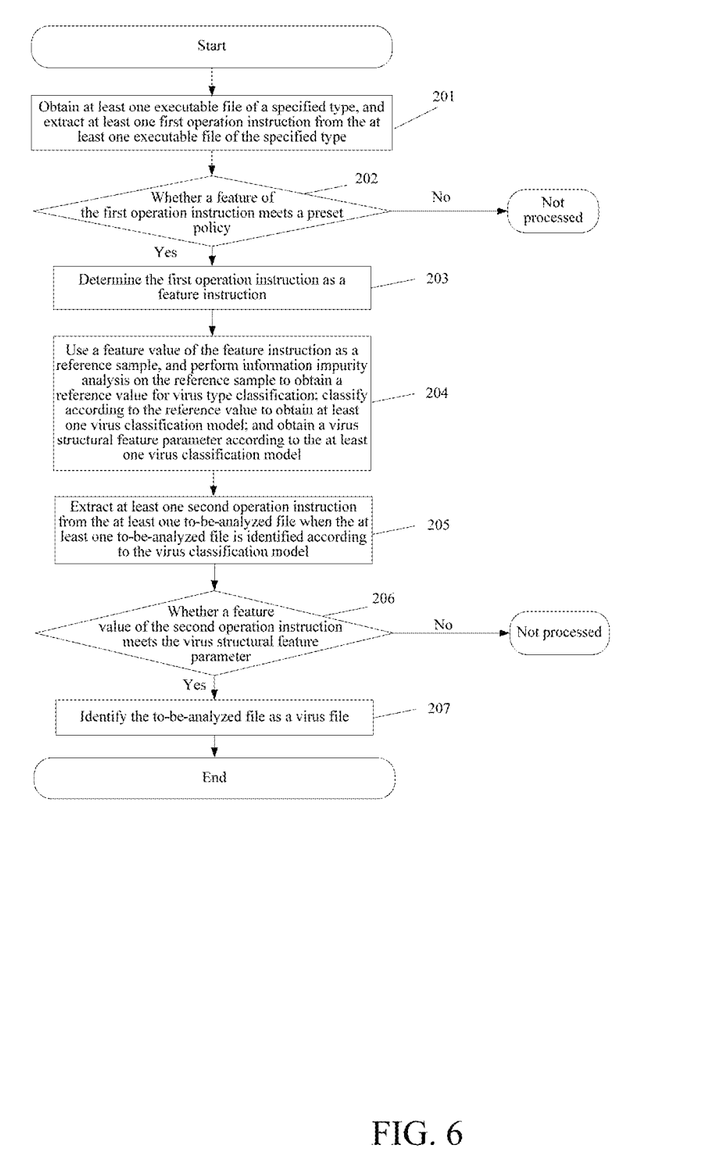
FIG. 6 is a schematic diagram of an implementation process according to various embodiments of the present disclosure.

An information processing method of another embodiment of the present disclosure, as shown in FIG. 6, the method includes the following steps.

Step 201. Acquire at least one executable file of a specified type, and extract at least one first operation instruction from the at least one executable file of the specified type.

In some embodiments, because a virus file is usually an executable file, the executable file that may be the virus file is first checked and analyzed. The executable file that may be the virus file may be referred to as a PE file. A file name extension of the PE file is usually ".exe". The PE file includes a large number of static information. The static information includes general information and instruction information. For example, the general information may be function entry information, and the instruction information is an operation instruction calling the function.

Step 202. Determine whether a feature of the first operation instruction meets a preset policy. If the feature of the first operation instruction meets a preset policy, step 203 is performed. Otherwise, no processing step is executed.

In some embodiments, because the server does not determine whether the PE file is a file required analyzing, that is, a known virus file, instruction information in the PE file needs to be identified and analyzed.

Because instruction information of the known virus file has particular features. For example, some instruction information in the virus file may call some special system application programming interface (API) functions to achieve the objective of disruption, such as a reading and writing operation on a register or modifying a system key path. Viruses of a same type often have similar code. For example, the instruction information having these features occurs for many times frequently, or the instruction information that does not have a particular feature also occurs for many times frequently under a condition of uncertainty. For example, many viruses may extract an area size or an edge at an entry of code as a feature value by using an encryption technology. Therefore, by using these situations (e.g., coverage area and edge condition of the API entry) as a preset policy, the instruction information in the PE file is checked and analyzed, and compared with the feature in the preset policy according to the feature of the instruction information. If it is found that the instruction information has a particular feature, such instruction information is considered an important feature instruction, and used for subsequently constructing a classifier.

Step 203. Determine the first operation instruction as a feature instruction if the feature of the first operation instruction meets the preset policy.

In some embodiments, the preset policy includes: as referred in step 202, some instruction information in the virus file may call some special system application programming interface (API) function to achieve the objective of disruption, such as a reading and writing operation on a register or modifying a system key path. Viruses of a same type often have similar code. For example, the instruction information having these features occurs for many times frequently, or the instruction information that does not have a particular feature also occurs for many times frequently under a condition of uncertainty. For example, many viruses may extract an area size or an edge at an entry of code as a feature value by using an encryption technology. Strategies are not limited in this context.

Step 204. Use the feature value of the feature instruction as a reference sample, and perform information impurity analysis on the reference sample to obtain a reference value for virus type classification; classify according to the reference value to obtain at least one virus classification model; and obtain the virus structural feature parameter used for representing virus classification according to the at least one virus classification model.

In some embodiments, by analyzing a feature value of an important feature instruction in a known virus file through steps 201-203, and constructing a virus classification model by using the feature value of the feature instruction, a virus structural feature parameter obtained through analysis can certainly summarize a general performance of most viruses and variations thereof or new viruses having a similar structure, thereby providing a better determining basis for final virus detecting.

In some embodiments, the classifying the virus classification model according to the reference value to obtain at least one virus classification model may include: when the virus classification model is a decision tree model, using the reference value as a branch node of the decision tree, performing classification respectively toward a left side and a right side of the branch node and constructing at least one classification and regression tree in a reducing direction of a residual gradient, and forming the at least one virus classification model by using the at least one classification and regression tree.

Step 205. Extract at least one second operation instruction from the at least one to-be-analyzed file when the at least one to-be-analyzed file is identified according to the virus classification model.

The to-be-analyzed file may be a new virus file, or may be a normal file without a virus. Identification performed on the at least one to-be-analyzed file according to the virus classification model actually is a matching of virus structural feature parameters. The virus classification model includes structural feature parameters of various viruses. The virus classification model is at least one. When the virus classification model is more than one, for example, two virus classification models, a virus structural feature parameter in any one of the virus classification models may be used to match the to-be-analyzed file. Alternatively, the two virus classification models may be iterated or superimposed to first obtain a comprehensive classification model, and then the virus structural feature parameter in the comprehensive classification model is used to match the to-be-analyzed file. In some embodiments, the virus classification models may be more, such as five, and a comprehensive classification model may be obtained by using one virus classification model to iterate or superimpose at least one virus classification model thereof, for example, respectively iterating or superimposing in pairs to obtain a first comprehensive classification model and a second comprehensive classification model, and then iterating or superimposing a remaining original classification model. FIG. 3-FIG. 5 show several examples of iterated or superimposed combinations of classification models (or referred to as a classifier).

Step 206. Determine whether a feature value of the second operation instruction meets the virus structural feature parameter. If the feature value of the second operation instruction meets the virus structural feature parameter, step 207 is performed. Otherwise, no processing step is executed.

Step 207. Identify the to-be-analyzed file as a virus file if the feature value of the second operation instruction meets the virus structural feature parameter.

The to-be-analyzed file may be a new virus file, or may be a normal file without a virus. A feature value of the instruction information is extracted from the to-be-analyzed file, that the identification performed on the at least one to-be-analyzed file according to the virus classification model actually is a matching of virus structural feature parameters. As long as there is at least one matching result, it indicates that the to-be-analyzed file is a virus file. Further, a virus type of the virus file, or a virus type of one or more instruction information in the virus file is distinguished according to a virus classification result of the virus classification model.

Based on the above disclosed information processing method, a specific application of an information processing method according to an embodiment of the present disclosure may include: when the virus classification model is a decision tree model, using the reference value as a branch node of the decision tree, performing classification respectively toward a left side and a right side of the branch node, and constructing at least one classification and regression tree in the reducing direction of a residual gradient.

Figure 7:
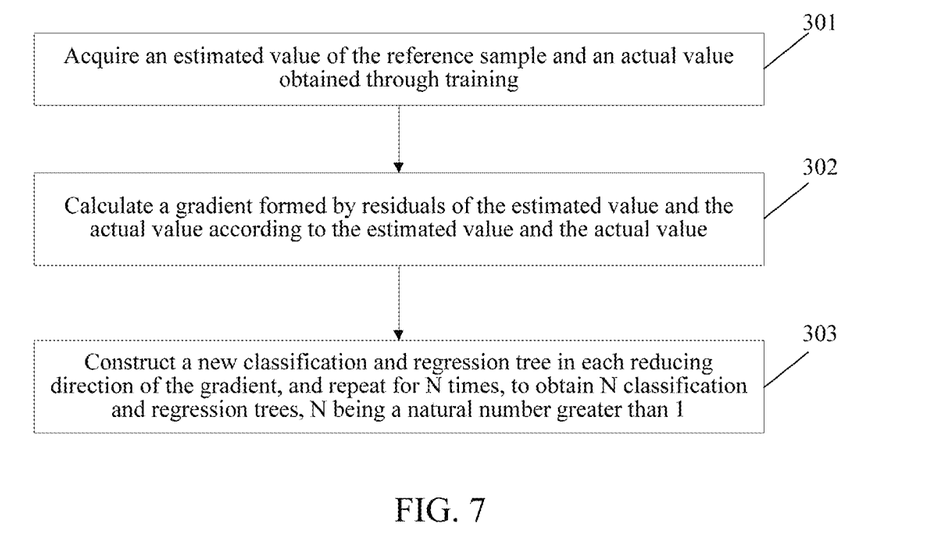
FIG. 7 is a schematic diagram of an implementation process according to various embodiments of the present disclosure.

As shown in FIG. 7, one embodiment may include the following steps.

Step 301. Acquire an estimated value of the reference sample and an actual value obtained through training.

Step 302. Calculate a gradient formed by residuals of the estimated value and the actual value according to the estimated value and the actual value.

Step 303. Construct a new classification and regression tree in each reducing direction of the gradient, and repeat for N times, to obtain N classification and regression trees, N being a natural number greater than 1.

It should be noted that the following description related to a server is similar to the foregoing method description. Description of beneficial effects of the same method is not described herein again.

For technical details that are not disclosed in the embodiments of the present disclosure of the server, refer to the description of the foregoing embodiments of the present disclosure.

Figure 8:
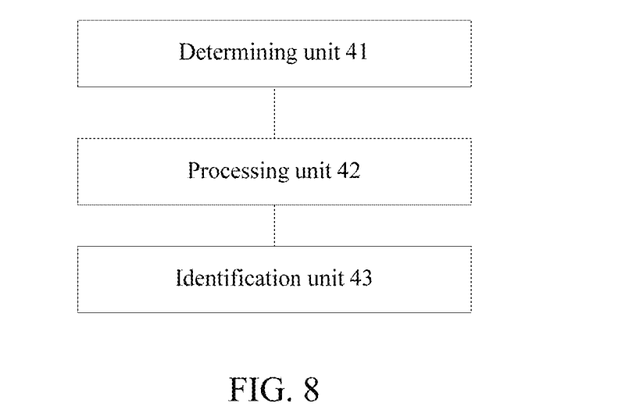
FIG. 8 is a schematic diagram of a composition structure according to various embodiments of the present disclosure.

A server according to an embodiment of the present disclosure, as shown in FIG. 8, may include the following components. The server may include a memory and a processor coupled to the memory. Multiple program units may be stored in the memory and to be executed by the processor. When executing the program units, the processor is configured to identify a virus.

A determining unit 41 may be configured to acquire at least one executable file of a specified type, extract at least one first operation instruction from the at least one executable file of the specified type, determine whether a feature of the first operation instruction meets a preset policy, and determine the first operation instruction as a feature instruction if the preset policy is met.

A processing unit 42 may be configured to extract a feature value of the feature instruction, construct a virus classification model by using the feature value of the feature instruction, and obtain a virus structural feature parameter through analysis; and An identification unit 43 may be configured to extract at least one second operation instruction from at least one to-be-analyzed file when the at least one to-be-analyzed file is identified according to the virus classification model, determine whether a feature value of the second operation instruction meets the virus structural feature parameter, and identify the to-be-analyzed file as a virus file if the virus structural feature parameter is met.

According to this embodiment of the present disclosure, through the determining unit 41, the processing unit 42, and the identification unit 43, an executable file that may be the virus file can be identified and analyzed. When a feature of a first operation instruction in the executable file meets a preset policy, the executable file is considered a known virus file. A first operation instruction that meets the preset policy in the known virus file is considered a feature instruction and a feature value thereof is extracted, so as to construct a virus classification model according to the extracted feature value, thereby obtaining a virus structural feature parameter through analysis. Identification is performed on a to-be-analyzed file to determine whether to extract a second operation instruction from the to-be-analyzed file when the to-be-analyzed file is a virus file, and to determine whether a feature value of the second operation instruction meets the virus structural feature parameter. If the virus structural feature parameter is met, the to-be-analyzed file is identified as a virus file. A virus can be precisely identified merely through a comparison of structural feature parameters and without a manual intervention of an analysis of virus identification, thereby improving identification precision and identification efficiency.

In a specific application of this embodiment of the present disclosure, the determining unit 41 may be further configured to determine whether a feature of the first operation instruction meets a preset policy by using one or more of the following manners. In the first example, the step may include: determining whether the first operation instruction is used to call a specified system application programming interface API function to perform operations including modifying a registry or modifying a system critical path, and if the first operation instruction is used to call the specified system application programming interface API function to perform operations including modifying a registry or modifying a system critical path, determining that the preset policy is met. In the second example, the step may include: determining whether occurrence frequency and/or the number of times of the first operation instruction reach/reaches a preset threshold; if the occurrence frequency and/or the number of times of the first operation instruction reach/reaches the preset threshold, determining that the preset policy is met. In the third example, the step may include: determining whether an area size and/or an edge at an entry of static code information included by the first operation instruction meet/meets a preset condition, if the area size and/or the edge at the entry of the static code information included by the first operation instruction meet/meets the preset condition, determining that the preset policy is met.

Because instruction information of the known virus file has particular features. For example, some instruction information in the virus file may call some special system application programming interface (API) function to achieve the objective of disruption, such as a reading and writing operation on a register or modifying a system key path. Viruses of a same type often have similar code. For example, the instruction information having these features occurs for many times frequently, or occurrence frequency and frequency of the instruction information that does not have a particular feature also occurs for many times frequently under a condition of uncertainty. For example, many viruses may extract an area size or an edge at an entry of code as a feature value by using an encryption technology. Therefore, by using these situations (e.g., coverage area and edge condition of the API entry) as a preset policy, the instruction information in the PE file is identified and analyzed, and compared with the feature in the preset policy according to the feature of the instruction information. If it is found that the instruction information has particular features, such instruction information is considered an important feature instruction, and used for subsequently constructing a classifier.

In a specific application of this embodiment of the present disclosure, the processing unit 42 may further include: a first processing sub-unit, configured to take a feature value of the feature instruction as a reference sample, and perform information impurity analysis on the reference sample to obtain a reference value for virus type classification; and a second processing sub-unit, configured to classify the virus classification model according to the reference value to obtain at least one virus classification model, and obtain the virus structural feature parameter used for representing virus classification through the at least one virus classification model.

In some embodiments, the first processing sub-unit may be specifically a feature value extracting module, configured to extract a feature value of a feature instruction, take the feature value of the feature instruction as a reference sample, and perform information impurity analysis on the reference sample to obtain a reference value for virus type classification. The second processing sub-unit may be specifically a classifier construction module, configured to classify the virus classification model according to the reference value to obtain at least one virus classification model, and obtain the virus structural feature parameter used for representing virus classification according to the at least one virus classification model. Correspondingly, the identification unit may be specifically a virus detection module, configured to identify a virus and detect which virus classification the detected virus is.

It should be noted that, when the virus classification model is a decision tree model, the classifier construction module takes the reference value as a branch node of the decision tree to classify separately toward a left side and a right side of the branch node and construct at least one classification and regression tree in the reducing direction of a residual gradient. The at least one virus classification model is formed by using the at least one classification and regression tree. Specifically, an estimated value of the reference sample and an actual value acquired through training are obtained. A gradient formed by residuals of the estimated value and the actual value is calculated according to the estimated value and the actual value. A new classification and regression tree is constructed in each reducing direction of the gradient. This is repeated for N times to obtain N classification and regression trees, N being a natural number greater than 1.

Specific examples and algorithm descriptions of a feature value extracting module, a classifier construction module, and a virus detection module refer to the following detailed application scenarios description.

Embodiment 5

It should be noted that the server described above may be formed by a cluster system. The server is an electronic device for implementing integration of functional units or with functional units independently configured. A client and a server both include at least a database used for storing data and a processor used for data processing, or a storage medium disposed in the server or a storage medium independently set.

For the processor used for data processing, the data processing may be implemented by using a microprocessor, a central processing unit (CPU, Central Processing Unit), a digital signal processor (DSP, Digital Signal Processor), or a field-programmable gate array (FPGA, Field-Programmable Gate Array). For the storage medium, an operation instruction is included. The operation instruction may be computer executable code. Steps of a procedure of an information processing method according to the embodiments of the present disclosure are implemented through the operation instruction.

Figure 9:
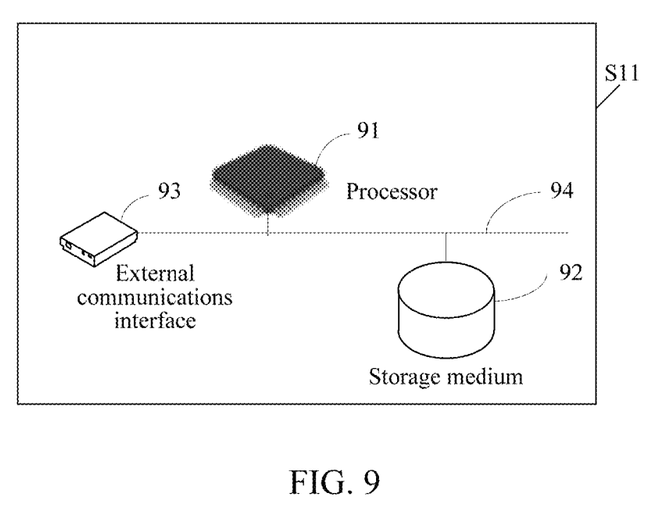
FIG. 9 is a schematic diagram of a hardware structure according to various embodiments of the present disclosure.

An example in which the server serves as a hardware entity S11 is shown in FIG. 9. The device includes a processor 51, a storage medium 52 and at least one external communications interface 53. The Processor 51, the storage medium 52 and the external communications interface 53 are connected by a bus 54.

An embodiment of the present disclosure further provides a computer storage medium. The computer storage medium stores computer executable instructions, and the computer executable instructions are used to perform the information processing method.

The following describes an embodiment of the present disclosure by using an example.

In an application scenario of virus identification, according to an embodiment of the present disclosure, a solution for classifying and predicting an unknown virus based on a gradient boosting decision tree is used. In an virus identification technology, according to this embodiment of the present disclosure, a type of a virus is predicted mainly by analyzing a degree of similarity between an important feature instruction structure of an unknown virus PE file and an important feature instruction structure of a known virus PE file, thereby improving a success rate of detecting an unknown virus. In addition, this solution merely needs to extract static information from the PE file and analyze the static information, without running the file with virus.

The method according to the embodiment of the present disclosure may be implemented by using a feature value extracting module, a classifier construction module, and a virus detection module. Specific examples and algorithms thereof are described in the following. By using the feature value extracting module, the classifier construction module, and the virus detection module, at least the following processes need to be completed: 1) extracting and processing a feature of a known virus; 2) saving the extracted feature into a database for subsequently constructing a classifier; 3) constructing the classifier used for identifying a virus and specific virus classification according to the extracted feature; 4) detecting an unknown virus file by using the constructed classifier, identifying the virus, and outputting a virus classification.

For the feature value extracting module, most virus files are PE-format files. The virus files are similar to general PE files when performing various operations. However, the virus files always call some special system API functions to achieve the objective of disruption, such as a reading and writing operation on a register, or modifying a system key path. Viruses of a same type often have similar code. Therefore, an important feature instruction in the PE file is extracted, and occurrence frequency of the feature instruction is used as a determining basis. Because many viruses use an encryption technology, an area size or an edge at an entry of code may be extracted as a feature value to perform comparison. For example, in m PE-format virus files, n meaningful operation instructions may be selected as a feature to be extracted to form an m*n matrix X. X (ij) represents occurrence frequency of a $j^{th}$ feature in an $i^{th}$ file. A virus type corresponding to the m virus files is a m-dimensional Vector Y, and Y(i) represents a virus type of an $i^{th}$ virus file. In short, by analyzing an important instruction in a PE file and a degree of similarity of structure, a virus is identified and a virus type is determined.

For the classifier construction module, the classifier of this embodiment of the present disclosure is implemented by using a gradient boosted decision tree. The principle is that, an estimated value is assigned to each sample when an algorithm starts; the initial estimated value of each sample is same; an estimation of a data point may be right or wrong by using a model (a classification and regression tree) obtained in each step of training; a gradient of a residual of the estimated value and an actual value of the date point is calculated; by constructing a new model in a reducing direction of a model gradient, and repeating for N times (N is specified by a user), N simple classifiers (the classification and regression tree) may be obtained; and the N classifiers are combined (by weighting or voting) to obtain a final model. The N simple classifiers are constructed by using the classification and regression tree, and specific steps include the following.

a. Input gradients g of X and Y-p.

b. Traverse X; select a feature value X(ij) with any feature; calculate information impurity level (dispersion level) (or a GINI index, a double exponential index, or an ordered double exponential index) classified by the feature value, where a higher information impurity level indicates more mixed virus types included by present X of the information; and find X (kl) when the information impurity level is lowest.

c. Evaluate all values d (k){k: 1, 2 . . . } greater than X (kl) in X (il){i: 0~m-1}; all d (k) rows of X form a left subtree data set LX, correspondingly, g is Lg; and remaining rows form a right subtree data set RX, correspondingly, the virus types are Rg.

d. If the number of the classified LX, RX is less than user a specified amount, return to a step, and continue to search X (kl); if information impurity level is less than a particular value, perform e step. Otherwise, perform g step.

e. Return an average value of g corresponding to the present X as a leaf node of the classification tree.

f Select X (kl) as a split node, where a left subtree of the node is the data sets LX, Lg greater than the feature value, and a right subtree of the node is the data sets RX, Rg less than or equal to the feature value.

g. Perform step b by using the data sets LX, Lg of the left subtree as new data sets X, g.

h. Perform step c by using the data sets RX, Rg of the right subtree as new data sets X, g.

There are two key points in the this method. First, the method includes amplifying a signal by using a classification and regression tree, using information impurity as a branch node of the tree, and analogizing a function mechanism of a magnifier used in communications, so that the signal can be more easily identified and distinguished. Similarly, lower information impurity is more easily used as a reference value to perform classification. Therefore, virus classification can be more easily obtained by using such an information impurity analysis. Second, the method includes constructing a classification and regression tree in a reducing direction of a residual gradient, thereby enabling a predicted result to be closer to a real result.

For the virus detection module, N simple classifiers are obtained in the classifier. The unknown virus file is analyzed by using the N classifiers in sequence. An appropriate leaf node is selected according to the branch condition of the tree when the virus file is analyzed each time. An obtained information gain of the leaf node determined by the classifier is calculated. A maximum information gain is calculated. Any one of the classifiers may be used, or a method of iterating multiple classifiers may be used. This iteration solution can avoid overfitting of a tree, and improve a success rate of identifying and classifying a virus.

In the embodiments provided in the present application, it should be understood that the disclosed device and method may be implemented in other manners. The described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections of components may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may include alone physically, or two or more units are integrated into one unit. The integrated unit may be implemented through hardware, or may be implemented in a form of hardware plus a software functional module.

A person of ordinary skill in the art may understand that all or some of the steps of the foregoing embodiments may be implemented by a program instructing relevant hardware. The foregoing program may be stored in a computer readable storage medium. When the program runs, the steps of the foregoing embodiments are performed. The foregoing storage medium includes: any medium that can store program code, such as a removable storage device, a read-only memory (ROM, Read-Only Memory), a random access memory (RAM, Random Access Memory), a magnetic disk, or an optical disc.

Alternatively, when the integrated unit is implemented in the form of a software functional unit and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a removable storage device, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

According to the embodiments of the present disclosure, an executable file that may be a virus file is identified and analyzed. When a feature of a first operation instruction in the executable file meets a preset policy, the executable file is considered a known virus file. A first operation instruction that meets the preset policy in the known virus file is considered a feature instruction and a feature value thereof is extracted, so as to construct a virus classification model according to the extracted feature value, thereby obtaining a virus structural feature parameter through analysis.

According to the embodiments of the present disclosure, an executable file that may be a virus file is identified and analyzed. When it is found that a feature of a first operation instruction in the executable file meets a preset policy, the executable file is considered a known virus file. A first operation instruction that meets the preset policy in the known virus file is considered a feature instruction and a feature value thereof is extracted, so as to construct a virus classification model according to the extracted feature value, thereby obtaining a virus structural feature parameter through analysis. Embodiments of the present disclosure identify a to-be-analyzed file to determine whether to extract a second operation instruction from the to-be-analyzed file when the to-be-analyzed file is a virus file, and to determine whether a feature value of the second operation instruction meets the virus structural feature parameter. If the virus structural feature parameter is met, the to-be-analyzed file is identified as a virus file. A virus can be precisely identified through a comparison of structural feature parameters and without a manual intervention of an analysis of virus identification, thereby improving identification precision and identification efficiency.

Identification is performed on a to-be-analyzed file to determine whether to extract a second operation instruction from the to-be-analyzed file when the to-be-analyzed file is a virus file, and to determine whether a feature value of the second operation instruction meets the virus structural feature parameter. If the virus structural feature parameter is met, the to-be-analyzed file is identified as a virus file. A virus can be precisely identified merely through a comparison of structural feature parameters and without a manual intervention of an analysis of virus identification, thereby improving identification precision and identification efficiency.

What is claimed is:

1. A method of identifying a virus-containing file, the method comprising:
   acquiring at least one executable file;
   extracting a first operation instruction from the at least one executable file in response to determining the first operation instruction meets a preset policy;
   extracting a feature value from the first operation instruction;
   performing an information impurity analysis on the feature value to obtain a reference value including information impurity;
   constructing a comprehensive virus classification model, wherein the comprehensive virus classification model includes a first virus classification model, a second virus classification model, and a third virus classification model, wherein the first and the second virus classification models are iterated or superimposed to form a first comprehensive virus classification model, and wherein any one of the first, the second, and the third virus classification models is constructed based on the reference value and by:
      basing the any one of the first, the second, and the third virus classification models on a decision tree and using the reference value as a branch node of the decision tree, wherein the branch node includes information impurity of the reference value, wherein the reference value includes a first reference value including a first information impurity and a second reference value including a second information impurity lower in level of impurity than the first information impurity, and wherein the any one of the first, the second, and the third virus classification models is constructed based on the second reference value including the second information impurity and not based on the first reference value including the first information impurity;
      performing classification respectively toward a left side and a right side of the branch node to obtain a residual gradient;
      constructing a classification and regression tree in a reducing direction of the residual gradient; and
      forming the any one of the first, the second, and the third virus classification models based on the classification and regression tree;
   obtaining a virus structural feature parameter from the comprehensive virus classification model;
   identifying a to-be-analyzed file according to the comprehensive virus classification model;
   extracting a second operation instruction from the to-be-analyzed file; and
   determining the to-be-analyzed file is a virus-containing file in response to determining a feature value of the second operation instruction corresponds to the virus structural feature parameter.

2. The method according to claim 1, further comprising: determining that the preset policy is met based on whether the first operation instruction is used to call a specified system application programming interface Application Program Interface (API) function to perform modifying a registry or modifying a system critical path.

3. The method according to claim 1, further comprising: determining that the preset policy is met based on whether an occurrence frequency or a number of times at which the first operation instruction is present is more than a preset threshold.

4. The method according to claim 1, further comprising: determining that the preset policy is met based on whether an area size or an edge at an entry of static code information included in the first operation instruction meets a preset condition.

5. The method according to claim 1, further comprising: repeating the constructing of the virus classification model N times, to obtain N classification and regression trees, N being a natural number greater than 1.

6. The method according to claim 5, wherein the virus structural parameter includes a first virus structural parameter and a second virus structural parameter, and wherein obtaining the virus structural feature parameter from the comprehensive virus classification model comprises:
   obtaining the first virus structural feature parameter from the first comprehensive virus classification model and obtaining the second virus structural feature parameter from the third virus classification model.

7. The method according to claim 5, wherein the comprehensive virus model further includes a fourth and a fifth virus models, and wherein the third, the fourth, and the fifth virus models are iterated or superimposed in pairs to form a second comprehensive virus model.

8. The method according to claim 7, wherein obtaining the virus structural feature parameter from the comprehensive virus classification model comprises:
   obtaining the virus structural feature parameter from at least one of the first comprehensive virus model and the second comprehensive virus model.

9. A server for identifying a virus-containing file, comprising: a memory and a processor coupled to the memory, the processor being configured to perform:
   acquiring at least one executable file;
   extracting a first operation instruction from the at least one executable file;
   extracting a feature value from the first operation instruction;
   performing an information impurity analysis on the feature value to obtain a reference value including information impurity;
   constructing a comprehensive virus classification model, wherein the comprehensive virus classification model includes a first virus classification model, a second virus classification model, and a third virus classification model, wherein the first and the second virus classification models are iterated or superimposed to form a first comprehensive virus classification model, and wherein any one of the first, the second, and the third virus classification models is constructed based on the reference value and by:
      basing the any one of the first, the second, and the third virus classification models on a decision tree and using the reference value as a branch node of the decision tree, wherein the branch node includes the impurity information of the reference value, wherein the reference value includes a first reference value including a first information impurity and a second reference value including a second information impurity lower in level of impurity than the first information impurity, and wherein the any one of the first, the second, and the third virus classification models is constructed based on the second reference value including the second information impurity and not based on the first reference value including the first information impurity;

performing classification respectively toward a left side and a right side of the branch node to obtain a residual gradient;

constructing a classification and regression tree in a reducing direction of the residual gradient; and forming the any one of the first, the second, and the third virus classification models based on the classification and regression tree;

obtaining a virus structural feature parameter from the comprehensive virus classification model;

identifying a to-be-analyzed file according to the comprehensive virus classification model;

extracting a second operation instruction from the to-be-analyzed file; and determining the to-be-analyzed file is a virus-containing file in response to determining a feature value of the second operation instruction corresponds to the virus structural feature parameter.

10. The server according to claim 9, wherein the processor is further configured to perform:
determining that the preset policy is met based on whether the first operation instruction is used to call a specified system API function to perform modifying a registry or modifying a system critical path.

11. The server according to claim 9, wherein the processor is further configured to perform:
determining whether the preset policy is met based on whether occurrence frequency or the number of times at which the first operation instruction is found present reaches a preset threshold.

12. The server according to claim 9, wherein the processor is further configured to perform:
determining whether the preset policy is met based on whether an area size or an edge at an entry of static code information included in the first operation instruction meets a preset condition.

13. The server according to claim 9, wherein the processor further configured to perform:
repeating constructing the virus classification model for N times, to obtain N classification and regression trees, N being a natural number greater than 1.

14. A non-transitory computer storage medium, storing a computer executable instruction configured to perform a method of identifying a virus-containing file, the method comprising:
acquiring at least one executable file;
extracting a first operation instruction from the at least one executable file in response to determining the first operation instruction meets a preset policy;
extracting a feature value from the first operation instruction;
performing an information impurity analysis on the feature value to obtain a reference value including information impurity;
constructing a comprehensive virus classification model, wherein the comprehensive virus classification model includes a first virus classification model, a second virus classification model, and a third virus classification model, wherein the first and the second virus classification models are iterated or superimposed to form a first comprehensive virus classification model, and wherein any one of the first, the second, and the third virus classification models is constructed based on the reference value and by:
basing the any one of the first, the second, and the third virus classification models on a decision tree and using the reference value as a branch node of the decision tree, wherein the branch node includes the information impurity of the reference value, wherein the reference value includes a first reference value including a first information impurity and a second reference value including a second information impurity lower in level of impurity than the first information impurity, and wherein the any one of the first, the second, and the third virus classification models is constructed based on the second reference value including the second information impurity and not based on the first reference value including the first information impurity;
performing classification respectively toward a left side and a right side of the branch node to obtain a residual gradient;
constructing a classification and regression tree in a reducing direction of the residual gradient; and
forming the any one of the first, the second, and the third virus classification models based on the classification and regression tree;
obtaining a virus structural feature parameter from the comprehensive virus classification model;
identifying a to-be-analyzed file according to the comprehensive virus classification model;
extracting a second operation instruction from the to-be-analyzed file; and
determining the to-be-analyzed file is a virus file in response to determining a feature value of the second operation instruction corresponds to the virus structural feature parameter.

15. The non-transitory computer storage medium according to claim 14, wherein the method further comprises:
determining that the preset policy is met based on whether the first operation instruction is used to call a specified system application programming interface Application Program Interface (API) function to perform modifying a registry or modifying a system critical path.

16. The non-transitory computer storage medium according to claim 14, wherein the method further comprises:
determining that the preset policy is met based on whether an occurrence frequency or a number of times at which the first operation instruction is found present is more than a preset threshold.

17. The non-transitory computer storage medium according to claim 14, wherein the method further comprises:
determining that the preset policy is met based on whether an area size or an edge at an entry of static code information included in the first operation instruction meets a preset condition.

* * * * *